United States Patent Office 3,257,388
Patented June 21, 1966

3,257,388
6-DIFLUOROMETHYL AND 6-TRIFLUOROMETHYL $\Delta^{1,4}$-PREGNADIENES AND THE 16α,17α ACETONIDES THEREOF
Albert Bowers and John Edwards, Mexico City, Mexico, assignors, by mesne assignments, to Syntex Corporation, a corporation of Panama
No Drawing. Filed Nov. 10, 1960, Ser. No. 68,374
22 Claims. (Cl. 260—239.55)

The present invention relates to novel cyclopentanophenanthrene compounds and to a novel process for the production thereof.

More particularly the present invention relates to novel C-6-monofluoromethyl and C-6-polyfluoromethyl cortical hormone derivatives and more specifically to derivatives of $\Delta^4$-pregnene-11β,17α,21-triol-3,20-dione and $\Delta^4$-pregnene-17α,21-diol-3,11,20-trione which may also contain halogen at C-9α, a methyl group in α or β steric configuration at C-16, a hydroxy or acyloxy group at C-16α, the cyclic acetal or cyclic ketal grouping at C-16α,17α, and further unsaturation at C-1,2 and/or C-6,7.

The novel compounds of the present invention which are potent cortical hormones exhibiting glycogenic, thymolytic, catabolic, anti-inflammatory, anti-androgenic, anti-estrogenic, and anti-gonadotrophic activities as well as suppress the pituitary are represented by the following formulas:

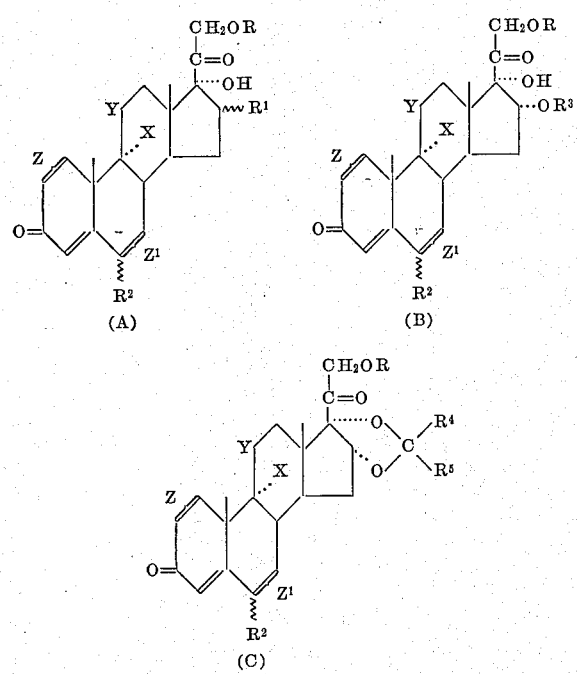

In the above formulas Y represents β-hydroxy or keto; X represents hydrogen, fluorine or chlorine; Z indicates a double bond or a saturated linkage between C-1 and C-2; Z' indicates a double bond or a saturated linkage between C-6 and C-7; R and R³ represent hydrogen or a hydrocarbon carboxylic acyl group; R¹ represents hydrogen, α-methyl or β-methyl; R² represents the monofluoromethyl, difluoromethyl or trifluoromethyl group; R⁴ and R⁵ represent hydrogen or an alkyl, aryl or aralkyl group containing from 1 to 8 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

Compounds of Formulas B and C are particularly powerful cortical hormones having anti-inflammatory activity when administered both by injection and topical application.

The novel compounds of the present invention may be prepared by a process illustrated in part by the following equation:

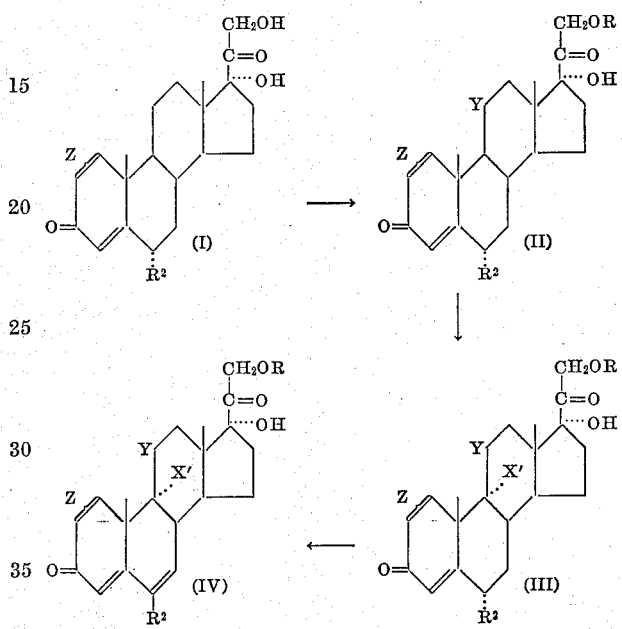

In the above formulas X' represents fluorine or chlorine and Y, Z, R and R² have the same meaning as set forth above.

In practicing the process outlined above, 6α-monofluoromethyl or 6α-polyfluoromethyl-$\Delta^4$-pregnene-17α,21-diol-3,20-dione (I) described in our copending application, Serial No. 68,376 filed November 10, 1960, are subjected to microbiological oxidation as by incubation with adrenal glands or with the microorganism *Curvularia lunata* or *Cunninghamella bainieri*, to form the corresponding 6α-monofluoromethyl, 6α-difluoromethyl and 6α-trifluoromethyl hydrocortisone derivatives (II:Y=hydroxyl; Z=saturated linkage) which can be further dehydrogenated at C-1,2 by treatment with selenium dioxide in mixture with t-butanol in the presence of catalytic amounts of pyridine or by refluxing with 2,3-dichloro-5,6-dicyano-1,4-benzoquinone in dioxane to afford the corresponding prednisolone derivatives (II:Y=hydroxyl; Z=double bond).

Conventional esterification of the 6α-monofluoromethyl and 6α-polyfluoromethyl derivatives of hydrocortisone and of prednisolone with hydrocarbon carboxylic acid anhydrides or chlorides of less than 12 carbon atoms, afford the C-21 esters thereof which upon oxidation by conventional methods are converted into the corresponding C-21 esters of 6α-monofluoromethyl and 6α-polyfluoromethyl derivatives of cortisone and of prednisone (II:Y=keto).

Alternatively the dehydrogenation at C-1,2 may be effected prior to the microbiological oxidation for the introduction of the 11β-hydroxy group.

For introduction of a halogen atom at C-9α,6α-monofluoromethyl or 6α-polyfluoromethyl-hydrocortisone acetate is first dehydrated at C-9,11 by reaction with mesyl chloride in dimethylformamide pyridine solution to produce the corresponding 6α-fluoromethyl-Δ$^{4,9(11)}$-pregnadiene-17β,21-diol-3,20-dione 21-acetate. The latter compound is then subjected to the method described by Fried et al., J. Am. Chem. Soc. 79, 1130 (1957). This method entails treatment of the aforementioned compounds with a reagent capable of generating hypobromous acid such as an N-bromoimide or N-bromoamide or the hypobromite of an alkali or alkali-earth metal, preferably N-bromoacetamide and aqueous perchloric acid in dioxane to produce the bromohydrin. The latter is refluxed with potassium acetate in dioxane methanol to form the 9β,11β-oxido compound. By reaction with hydrogen fluoride or hydrogen chloride in an inert solvent such as chloroform or a mixture of tetrahydrofuran and methylene chloride under anhydrous conditions and low temperature, there is obtained the corresponding fluorohydrin or chlorohydrin, namely, 6α-monofluoromethyl or 6α-polyfluoromethyl-9α-fluorohydrocortisone acetate and 6α-monofluoromethyl or 6α-polyfluoromethyl-9α-chloro-hydrocortisone acetate, (III:Y=hydroxyl; Z=saturated linkage), which upon oxidation with chromic acid is converted into the corresponding 6α-monofluoromethyl or 6α-polyfluoromethyl derivatives of 9α-fluoro cortisone and of 9α-chlorocortisone aceates (III:Y=keto; Z=saturated linkage). Upon treatment of the aforementioned hydrocortisone and cortisone compounds with selenium dioxide in t-butanol and in the presence of catalytic amounts of pyridine or in the presence of 2,3-dichloro-5,6-dicyano-1,4-benzoquinone in dioxane, dehydrogenation at C-1,2 occurs and there is formed the acetates of 6α-monofluoromethyl or 6α-polyfluoromethyl-9α-fluoroprednisolone, 6α-monofluoromethyl or 6α-polyfluoromethyl - 9α - chloroprednisolone, 6α - monofluoromethyl or 6α - polyfluoromethyl-9α-fluoro-prednisone and 6α-monofluoromethyl or 6α-polyfluoromethyl-9α-chloroprednisone (III:Z=double bond).

The esters are converted into the corresponding free alcohols by treatment with dilute methanolic potassium hydroxide. By conventional esterification with hydrocarbon carboxylic acid anhydrides of the type mentioned previously, other C-21 esters are prepared.

The halogen atom may also be introduced at C-9α of 6α - monofluoromethyl-prednisolone or 6α - polyfluoromethyl-prednisolone in the same manner as in the corresponding hydrocortisone compounds with the elimination of the dehydrogenation step at C-1,2 to thus afford another route to the formation of the 9α-halo-6α-monofluoromethyl-prednisolone, 9α-halo-6α-polyfluoromethyl-prednisolone and the corresponding prednisone derivatives.

For introduction of a double bond at C-6,7, the 6α-monofluoromethyl or 6α-polyfluoromethyl derivatives of 9α-halo(fluoro or chloro)-hydrocortisone, 9α-halo(fluoro or chloro)-cortisone, 9α-halo(fluoro or chloro)-prednisolone, or 9α-halo(fluoro or chloro)-prednisone are refluxed with chloranil in a solvent such as tertiary amyl alcohol or tertiary butyl alcohol for a period of time of the order of 8 to 96 hours to form the corresponding 6-monofluoromethyl or 6-polyfluoromethyl derivatives of 9α-halo-(fluoro or chloro)-6-dehydrohydrocortisone, 9α - halo-(fluoro or chloro)-6-dehydrocortisone, 9α-halo(fluoro or chloro)-6-dehydro-prednisolone or 9α - halo(fluoro or chloro)-6-dehydro-prednisone (IV).

The novel compounds of the present invention having a methyl group at C-16 and a monofluoromethyl or polyfluoromethyl group at C-6α are prepared in the same manner as the compounds unsubstituted at C-16 except that 16(α or β)-methyl-6α-monofluoromethyl or polyfluoromethyl-Δ$^4$-pregnene-17α,21-diol-3,20-dione disclosed in our copending application Serial No. 68,376 filed of even date, is employed as the starting material and there are produced the corresponding 16α- and 16β-methyl-6α-monofluoromethyl, 16α- and 16β-methyl-6α-difluoromethyl and 16α- and 16β-methyl-6α-trifluoromethyl derivatives of hydrocortisone, cortisone, prednisolone and prednisone, as well as C-21 esters thereof with hydrocarbon carboxylic acid anhydrides of less than 12 carbon atoms and the 9α-halo(fluoro and chloro) derivatives thereof.

The novel C-6 substituted compounds of the present invention having a hydroxyl group at C-16α are prepared by a process illustrated by the following equation:

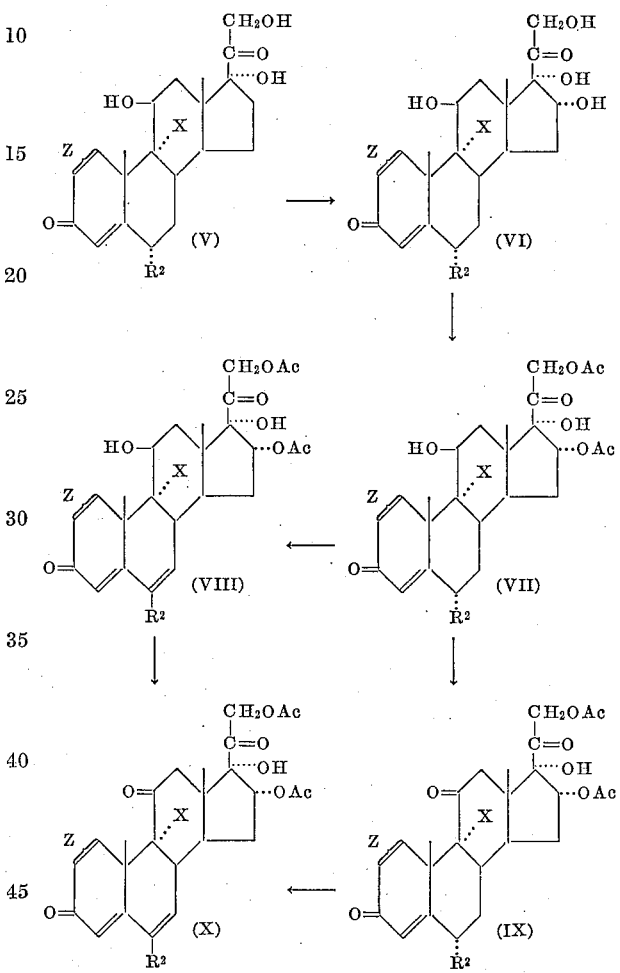

In the above formulas, Ac represents the acyl group of a hydrocarbon carboxylic acid of less than 12 carbon atoms, preferably the acetyl group, and X, R$^2$ and Z have the same meaning previously set forth.

In practicing the process outlined above, 6α-monofluoromethyl, 6α-difluoromethyl or the 6α-trifluoromethyl derivative of hydrocortisone, or the 1-dehydro or 9α-halo derivatives thereof (V) are subjected to microbiological oxidation with the microorganism Streptomyces roseochromogenus to thus form the corresponding 16α-hydroxy derivatives, namely 6α-monofluoromethyl-16α-hydroxy-hydrocortisone,
6α-monofluoromethyl-16α-hydroxy-prednisolone,
6α-difluoromethyl-16α-hydroxy-hydrocortisone,
6α-difluoromethyl-16α-hydroxy-prednisolone,
6α-trifluoromethyl-16α-hydroxy-hydrocortisone,
6α-trifluoromethyl-16α-hydroxy-prednisolone, and the
9α-fluoro and 9α-chloro derivatives thereof (VI).

Conventional esterification with a hydrocarbon carboxylic acid anhydride of the type previously described, and preferably acetic anhydride, affords the 16α,21-diesters of the above described compounds (VII). Upon oxidation of the latter compounds by conventional methods, the 11β-hydroxy group is converted into the 11-keto group to form the 6α-monofluoromethyl-16α-acyloxy-cortisone 21-acylate,
6α-difluoromethyl-16α-acyloxy-cortisone 21-acylate,
6α-trifluoromethyl-16α-acyloxy-cortisone 21-acylate,
6α-monofluoromethyl-16α-acyloxy-prednisone 21-acylate,
6α-difluoromethyl-16α-acyloxy-prednisone 21-acylate, 6α-trifluoromethyl-16α-acyloxy-prednisone 21-acylate and 9α-fluoro and 9α-chloro derivatives (IX).

For introduction of a double bond at C-6,7 the 6α-monofluoromethyl, 6α-difluoromethyl and 6α-trifluoromethyl derivatives of 16α-acyloxy-hydrocortisone 21-acylate, of 16α-acyloxy-prednisolone-21-acylate, of 16α-acyloxy-cortisone 21-acylate, of 16α-acyloxy-prednisone 21-acylate or their 9α-halo derivatives are refluxed with chloranil in tertiary butanol for about 24 hours to form the corresponding 6-dehydro derivatives (VIII and X). The 6-dehydro-cortisone and -prednisone derivatives (X) can also be prepared from the corresponding 6-dehydro-hydrocortisone or prednisolone derivatives (VIII) by oxidation of the 11β-hydroxy group to the 11-keto group as described previously.

The novel compounds of the present invention containing the monofluoromethyl and polyfluoromethyl groups at C-6α and the cyclic acetal or ketal grouping at C-16α,17α are prepared from the above described 16α-hydroxy derivative of hydrocortisone or prednisolone as illustrated in the following equation:

aldehyde, acetaldehyde, benzaldehyde, butanone and the like in the presence of catalytic amounts of perchloric acid to form a corresponding 16α,17α-cyclic ketal or 16α,17α-cyclic acetal (XI). Upon conventional esterification with a hydrocarbon carboxylic acid anhydride or chloride, there is formed the C-21 ester derivative (XII). In a similar manner as described previously for the 16α-hydroxy derivatives, oxidation at C-11β and/or dehydrogenation at C-6,7 yield the compounds of Formulas XIII, XIV and XV.

The following examples serve to illustrate but are not intended to limit the scope of the present invention:

EXAMPLE I

There were prepared the following solutions A, B and C using distilled water as solvent; for preparing solution A there were mixed 425 cc. of 1.74% dipotassium hydrogen phosphate ($K_2HPO_4$) and 75 cc. of a 1.38% solution of sodium dihydrogen phosphate ($NaH_2PO_4$); solution B was obtained by dissolving 45 g. of sodium chloride, 2.3 g. of potassium chloride and 1.91 g. of magnesium sulfate in water and diluting to a volume of 5 l.; solution C was obtained by dissolving 20.9 g. of fumaric acid and 14.4 g. of sodium hydroxide in 1.2 l. of water. There were then mixed 475 cc. of solution A, 4.32 l. of solution B and all of the solution C.

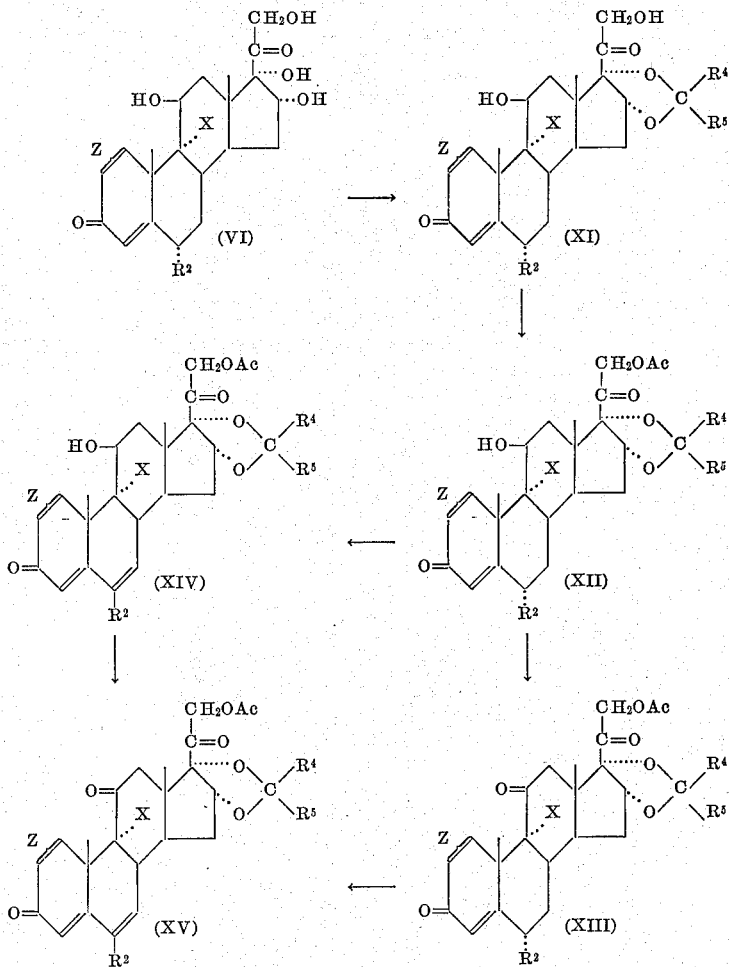

In the above formulas, X, Z, Ac, $R^2$, $R^4$ and $R^5$ have the same meaning as previously set forth.

In practicing the above described process, the 6α-monofluoromethyl or 6α-polyfluoromethyl derivative of 16α-hydroxy-hydrocortisone, 16α-hydroxy-prednisolone, 16α-hydroxy-9α-halo(fluoro or chloro)-hydrocortisone or 16α-hydroxy-9α-halo(fluoro or chloro)-prednisolone (VI) is reacted with a ketone or aldehyde such as acetone, form- The adrenal glands of recently slaughtered bovine were defatted and ground in a meat grinder to obtain an homogeneous mass; to 3 kg. of this mass was added the mixture of solutions A, B and C and after stirring vigorously there was added 3 g. of 6α - trifluoromethyl - 1 - Δ⁴-pregnene-17α,21-diol-3,20-dione, described in our aforesaid copending application, dissolved in 16 cc. of propylene glycol. The mixture was stirred at 28–37° C. for 3 hours and then treated with 80 l. of acetone and stirred for 1 hour further at room temperature.

The solid was filtered, washed with two portions of 10 l. each of acetone which were combined and concentrated under reduced pressure to a volume of approximately 5 l. taking care that the temperature did not rise over 30° C. The solution was then washed with 3 portions of 4.1 each of hexane, which was discarded; it was then extracted with 2 portions of 3 l. of methylene chloride and the extract was washed with water, dried over anhydrous sodium sulfate, filtered and concentrated to a volume of 300 cc. under reduced pressure and maintaining the temperature below room temperature. The concentrated solution was allowed ot pass through a column of a mixture of 90 g. of silica gel and 90 g. of celite. The column was washed with 3 l. of methylene chloride and then with 1 l. of methylene chloride-acetone (90:10). The product was eluted with mixtures of methylene chloride and acetone (80:20 and 70:30), the solvent was evaporated and the residue crystallized from ethyl acetate. There was thus obtained 6α-trifluoromethyl-hydrocortisone.

A mixture of 1 g. of the above compound, 10 cc. of pyridine and 2 cc. of acetic anhydride was kept for 3 hours at room temperature and then diluted with water; the solid was collected by filtration and crystallized from methylene chloride-methanol, thus giving 1.05 g. of the 21-acetate of 6α-trifluoromethyl-hydrocortisone.

A mixture of 1 g. of the above compound, 50 cc. of t-butanol, 0.4 g. of recently sublimed selenium dioxide and 0.2 cc. of pyridine was refluxed under an atmosphere of nitrogen for 48 hours, cooled, filtered through celite and the filtrate was evaporated under reduced pressure. The residue was refluxed with acetone and decolorizing charcoal for 1 hour, filtered through celite and the solvent was evaporated. By chromatography of the residue on neutral alumina there was obtained the 21-acetate of 6α-trifluoromethyl-prednisolone.

EXAMPLE II

A mixture of 3 g. of the 21-acetate of 6α-trifluoromethyl-hydrocortisone, obtained in accordance with Example I, 60 cc. of recently distilled dimethylformamide, 3.6 cc. of pyridine and 2.4 cc. of methanesulfonyl chloride was heated for 2 hours at 90° C. The cooled mixture was poured into aqueous saturated sodium bicarbonate solution and the product and was extracted with methylene chloride; the extract was washed with water, dried over anhydrous sodium sulfate and the solvent was evaporated. The residue was chromatographed on 90 g. of silica gel, eluting the product with methylene chloride-acetone (9:1); recrystallization of the product from methylene chloride-methanol yielded 1.6 g. of the 21-acetate of 6α-trifluoromethyl-$\Delta^{4,9(11)}$-pregnadiene-17α,21-diol-3,20-dione.

A mixture of 1.38 g. of the above compound and 15 cc. of dioxane was treated with 1.9 cc. of a 0.5 N aqueous solution of perchloric acid and 600 mg. of N-bromoacetamide, adding the latter in the dark, in 3 portions, over a period of half an hour and under continuous stirring. The mixture was stirred in the dark for 1¾ hours further, the excess of reagent was destroyed by the addition of aqueous sodium bisulfite solution, ice water was added and the product extracted with methylene chloride; the extract was washed with water, dried over anhydrous sodium sulfate and the solvent was evaporated under reduced pressure, thus affording the crude 21-acetate of 16a-trifluoromethyl-9a-bromohydrocortisone under the form of a yellow oil.

The above crude bromohydrine was refluxed for 6 hours with 2.5 g. of potassium acetate in 60 cc. of acetone. The acetone was distilled, water was added to the residue and the product was extracted with methylenechloride. The extract was washed with water, dried over anhydrous sodium sulfate and the solvent was evaporated. Recrystallization of the residue from methanol yielded 900 mg. of the 21-acetate of 6α-trifluoromethyl-9β,11β-oxido-$\Delta^4$-pregnene-17α,21-diol-3,20-dione.

To a solution of 1.6 g. of anhydrous hydrogen fluoride in 2.85 g. of tetrahydrofuran and 10 cc. of methylene chloride, cooled to −60° C., was added a solution of 650 mg. of the above epoxide in 20 cc. of methylene chloride. The mixture was kept at −10° C., for 72 hours, poured into aqueous saturated sodium bicarbonate solution and the organic layer was separated, washed with water, dried over anhydrous sodium sulfate and evaporated. The residue was reacetylated by heating for 1 hour on the steam bath with 3 cc. of acetic anhydride and 6 cc. of pyridine. The liquid was evaporated under reduced pressure and the residue was chromatographed on 30 g. of silica gel. Upon elution with methylene chloride-acetone (9:1), followed by crystallization of the residue from methylene chloride-methanol there was obtained 290 mg. of the 21-acetate of 6α-trifluoro-methyl-9α-fluorohydrocortisone.

By dehydrogenation with selenium dioxide, in accordance with the method described in the last paragraph of the preceding example, there was obtained the 21-acetate of 6α-trifluoromethyl-9α-fluoro-prednisolone.

100 mg. of the 21-acetate of 16α-trifluoromethyl-9α-fluoro-prednisolone was treated with 30 mg. of chromium trioxide in 5 cc. of 80% acetic acid, with stirring and at room temperature for 1 hour. After diluting with water the precipitate was collected, washed and crystallized from acetone-hexane, thus giving the 21-acetate of 6α-trifluoromethyl-9α-fluoro-prednisone.

EXAMPLE III

By oxidation of the 21-acetate of 6α-trifluoromethyl-9α-hydrocortisone with chromic acid, in accordance with the method described in the preceding example, there was obtained the 21-acetate of 16α-trifluoromethyl-9α-fluoro-cortisone.

Similarly, the 21-acetate of 6α-trifluoromethyl-prednisolone (Example I) was converted into the 21-acetate of 6α-trifluoromethyl-prednisone, and the 21-acetate of 16α-trifluoromethyl-hydrocortisone was converted into the 21-acetate of 6α-trifluoromethyl-cortisone.

EXAMPLE IV

A culture of *Cunninghamella bainieri* ATCC 9244 was prepared by inoculating an aqueous medium which contained 2% of peptone and 5% of corn syrup with a vegetating growth of the above culture in the same medium and stirring at 28° C. under aeration for 24 hours.

To 340 cc. of this culture there was then added 20 cc. of 1% ethanolic solution of 6α-difluoromethyl-$\Delta^4$-pregnene-17α,21-diol-3,20-dione, the mixture was stirred with aeration at 28° C. for 24 hours. The product of this incubation was extracted several times with methylene chloride, the extract was washed with water, dried over sodium sulfate, filtered and concentrated to a small volume under reduced pressure.

The concentrated extracts were adsorbed on a column prepared with 20 g. of silica gel and 20 g. of Celite, washed previously with methylene chloride. Elution with a mixture of methylene chloride acetone 80:20 and crystallization gave the 6α-difluoromethyl-$\Delta^4$-pregnene-11β,17α,21-triol-3,20-dione.

Acetylation of the above compound in a conventional manner, followed by oxidation with chromium trioxide in acetic acid, in accordance with the method of Example XII, gave 6α-difluoromethyl-cortisone acetate.

A mixture of 500 mg. of 6α-difluoromethyl-cortisone acetate, 10 cc. of dioxane and 350 mg. of 2,3-dichloro-5,6-dicyano-1,4-benzoquinone was refluxed for 18 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 6α-difluoromethyl-prednisone acetate.

EXAMPLE V

By following the method of Example I, 6α-monofluoromethyl-Δ$^4$-pregnene-17α,21-diol-3,20-dione was converted into 6α-monofluoromethyl-hydrocortisone, its acetate, and 6α-monofluoromethyl-prednisolone acetate.

In accordance with the method of Example II, the latter compound gave successively the 21-acetate of 6α-monofluoromethyl - Δ$^{1,4,9(11)}$ - pregnatriene - 17α,21 - diol-3,20 - dione, 6α - monofluoromethyl-9α-bromo-Δ$^{1,4}$-pregnadiene-11β,17α,21-triol-3,20-dione 21-acetate, 6α-monofluoromethyl - 9β,11β-oxido-Δ$^{1,4}$-pregnadiene-17α,21-diol-3,20-dione 21-acetate and 6α-monofluoromethyl-9α-fluoro-prednisolone acetate.

A solution of 500 mg. of the above compound in 20 cc. of methanol was mixed with 2.5 cc. of a 2% solution of potassium hydroxide in water, and stirred at 0° C. under an atmosphere of nitrogen for 1 hour; it was then neutralized with acetic acid and the methanol distilled under reduced pressure; the residue was triturated with water and the solid collected, washed with water, dried and recrystallized from acetone-hexane, thus giving 6α-monofluoromethyl-9α-fluoro-prednisolone.

EXAMPLE VI

By following the saponification method of the preceding example, the 21-acetates of 6α-trifluoromethyl-prednisolone and 9α - fluoro-6α - trifluoromethyl - prednisolone were converted into the corresponding free compounds; treatment with cyclopentylpropionic anhydride in pyridine solution, overnight at room temperature, gave respectively the cyclopentylpropionate of 6α-trifluoromethyl-prednisolone and the cyclopentylpropionate of 6α-trifluoromethyl-9α-fluoro-prednisolone.

EXAMPLE VII 500 mg. of 6α-difluoromethyl-16β-methyl-Δ$^{1,4}$-pregnadiene-17α,21-diol-3,20-dione were incubated with a culture of *Cunninghamella bainieri* ATCC 9244, in accordance with the method of Example IV, thus giving 6α-difluoromethyl-16α-methyl-prednisolone. Acetylation of the above compound in a conventional manner yielded the corresponding 21-acetate.

EXAMPLE VIII

In accordance with the method of Example I, 6α-difluoromethyl - 16α - methyl - Δ$^4$ - pregnene - 17α,21-diol-3,20-dione was converted into 6α-difluoromethyl-16α-methyl-hydrocortisone, which was acetylated at C–21 in a conventional manner. By following the method of Example II, there were obtained 6α-difluoromethyl-16α-methyl-Δ$^{4,9(11)}$-pregnadiene-17α,21-diol-3,20-dione 21-acetate, 6α-difluoromethyl-16α-methyl-9α-bromo-Δ$^4$-pregnene-11β,17α,21-triol-3,20-dione 21-acetate, 6α-difluoromethyl-16α-methyl-9β,11β-oxido-Δ$^4$-pregnene-17α,21-diol-3,20-dione 21-acetate, 6α-difluoromethyl-16α-methyl-9α-fluoro-hydrocortisone acetate, 6α-difluoromethyl-16α-methyl-9α-fluoro prednisolone acetate and 6α-difluoromethyl-16α-methyl-9α-fluoro-prednisone acetate.

EXAMPLE IX

A mixture of 1 g. of 6α-difluoromethyl-16β-methyl-prednisolone acetate, 2 g. of chloranil, 15 cc. of ethyl acetate and 5 cc. of acetic acid was refluxed under an atmosphere of nitrogen for 96 hours. It was then cooled, washed with a cold aqueous 10% sodium hydroxide solution until the washings were colorless, dried over anhydrous sodium sulfate and the ethyl acetate was evaporated. Chromatography of the residue on neutral alumina gave the pure 6-difluoromethyl-16β-methyl-Δ$^{1,4,6}$-pregnatriene-11β,17α,21-triol-3,20-dione acetate.

In a similar manner, 6α-trifluoromethyl-hydrocortisone acetate, 6α-trifluoromethyl prednisolone acetate, 6α-trifluoromethyl-9α-fluoro-hydrocortisone acetate and 6α-trifluoromethyl-9αfluoro-prednisone acetate were converted into the corresponding 6-dehydro derivatives.

EXAMPLE X

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

|  | G. |
|---|---|
| Glucose | 20 |
| (NH$_4$)$_2$ HPO$_4$ | 5 |
| or |  |
| NaNO$_3$ | 3 |
| K$_2$HPO$_4$ | 1 |
| MgSO$_4$.7H$_2$O | 0.2 |
| KCl | 0.5 |
| FeSO$_4$. 7H$_2$O | traces |
| Distilled water to complete | 1 l. |

The cultures were incubated under rotary stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotary stirring at 25° C. and 280 r.p.m.; to each flask there was added 0.5 cc. of a solution of 0.5 g. of 6α-monofluoromethyl-16α-methyl-Δ$^{1,4}$-pregnadiene-17α,21-diol-3,20-dione in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 4 g. of silica gel and eluted with methylene chloride (9:1) to produce 200 mg. of pure 6α-monofluoromethyl-16α-methyl-prednisolone. The latter was treated with 2 cc. of pyridine and 1 cc. of acetic anhydride and kept overnight at room temperature, after diluting with water the solid was collected by filtration and recrystallized from methylene chloride-methanol, thus giving the 21-acetate of 6α-monofluoromethyl-16α-methyl-prednisolone.

EXAMPLE XI

By following the method of the preceding example 6α - difluoromethyl - 16α - methyl - Δ$^4$ - pregnene - 17α, 21-diol-3,20-dione, 6α-difluoromethyl-16β-methyl-Δ$^4$-pregnene-17α,21-diol-3,20-dione and 6α-trifluoromethyl-16α-methyl-Δ$^4$-pregnene-17α,21-diol-3,20-dione were incubated with *Curvularia lunata* ATCC 13935, thus affording 6α-difluoromethyl-16α-methyl-hydrocortisone, 6α-difluoromethyl-16β-methyl hydrocortisone and 6α-trifluoromethyl-16α-methyl-hydrocortisone, respectively.

EXAMPLE XII 2 g. of 6α-trifluoromethyl-16α-methyl-hydrocortisone were converted into its acetate in a conventional manner, and then dehydrogenated with 2,3-dichloro-5,6-dicyano-1,4-benzoquinone, in accordance with the method of Example IV, thus giving 6α-trifluoromethyl-16α-methyl prednisolone acetate. Oxidation of the above compound with chromium trioxide in 80% acetic acid, according to the procedure of Example II, gave 6α-trifluoromethyl-16α-methyl-prednisone acetate.

EXAMPLE XIII

Example II was repeated, but using the acetates of 6α-monofluoromethyl-16α-methyl-hydrocortisone and 6α-difluoromethyl-16β-methyl-hydrocortisone as starting materials. There was thus obtained 6α-monofluoromethyl-16α-methyl - 9α - fluoro-hydrocortisone acetate, 6α-monofluoromethyl-16α-methyl-9α - fluoro-prednisolone acetate, 6α - monofluoromethyl-16α-methyl-9α-fluoro-prednisone acetate, 6α - difluoromethyl-16β-methyl-9α-fluoro-hydrocortisone acetate, 6α-difluoromethyl-16β-methyl-9α-fluoro-prednisolone acetate and 6α-difluoromethyl-16β-methyl-9α-fluoro-prednisone acetate.

EXAMPLE XIV

To a solution of 500 mg. of 6α-difluoromethyl-16α-methyl - 9β,11β-oxido-Δ$^4$-pregnene-17α,21-diol-3,20-dione 21-acetate (cf. Example VIII) in 10 cc. of redistilled chloroform was added 4 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and the chloroform was evaporated under reduced pressure. Crystallization of the residue gave the acetate of 6α-difluoromethyl-9α-chloro - 16α-methyl-hydrocortisone.

By dehydrogenation with 2,3-dichloro-5,6-dicyano-1,4-benzoquinone, in accordance with the method of Example IV, there was obtained 6α-difluoromethyl-9α-chloro-16α-methyl-prednisolone acetate.

EXAMPLE XV

A mixture of 1 g. of the 21-acetate of 6α-trifluoromethyl-16α-methyl-hydrocortisone (cf. Example XI), 2 g. of chloranil and 50 cc. of t-butanol was refluxed for 8 hours. The mixture was cooled, the excess of chloranil filtered and washed with ethyl acetate and the organic extracts washed with a cold aqueous solution of 10% sodium hydroxide until the washings were colorless. It was then dried over anhydrous soduim sulfate and the ethyl acetate was evaporated. Recrystallization from methylene chloride ether, after decolorization with 5 g. of alumina gave 6-trifluoromethyl-16α-methyl-Δ$^{4,6}$-pregnadiene-11β,17α,21-triol-3,20-dione 21-monoacetate.

EXAMPLE XVI

By following the dehydrogenation method of the preceding example, 6α-difluoromethyl-16α-methyl-9α-fluoro-prednisolone acetate (cf. Example VIII), 6α-monofluoromethyl-16α-methyl-prednisolone acetate (cf. Example X), 6α-trifluoromethyl - 16α - methyl-prednisone acetate (cf. Example XII) and 6α-difluoromethyl-9α-chloro-16α-methyl-prednisolone acetate (cf. Example XIV) were converted into the corresponding 6-dehydro derivatives, namely 6-difluoromethyl-16α-methyl-9α-fluoro-Δ$^{1,4,6}$-pregnatriene-11β,17α,21-triol-3,20-dione 21-acetate, 6-monofluoromethyl-16α-methyl-Δ$^{1,4,6}$-pregnatriene - 11β,17α,21-triol-3,20-dione 21-acetate, 6-trifluoromethyl-16α-methyl-Δ$^{1,4,6}$-pregnatriene-11β,17α,21-triol-3,20-dione 21-acetate and 6-difluoromethyl-9α-chloro-16α-methyl-Δ$^{1,4,6}$-pregnatriene-11β,17α,21-triol-3,20-dione 21-acetate.

EXAMPLE XVII

By following the method of Example XIV, 2 g. of 6α-monofluoromethyl - 16α - methyl-9β,11β-oxido-Δ$^4$-pregnene-17α,21-diol - 3,20 - dione 21-acetate intermediate in Example XIII was treated with dry hydrogen chloride in chloroform solution, thus giving 6α-monofluoromethyl-16α-methyl-9α-chloro-hydrocortisone acetate. Oxidation of the above compound with chromium trioxide in acetic acid, in accordance with the method of Example II, gave 6α-6α-monofluoromethyl-16α-methyl - 9α - chloro-cortisone acetate.

500 mg. of the above compound were treated with chloranil in t-butanol, by following the method of Example XV, thus producing 6-monofluoromethyl-16α-methyl-9α-chloro-Δ$^{4,6}$-pregnadiene-17α,21-diol-3,11,20-trione 21-acetate.

EXAMPLE XVIII

In accordance with the method of Example XIV, 6α-trifluoromethyl-9β,11β-oxido-Δ$^4$-pregnene - 17α,21 - diol-3,20-dione 21-monoacetate intermediate in Example II, was converted into 6α-trifluoromethyl-9α-chloro-hydrocortisone acetate.

Selenium dioxide oxidation of the above compound, according to the method of Example I, gave 6α-trifluoromethyl-9α-chloro-prednisolone acetate.

250 mg. of the above compound were treated with chromium trioxide in acetic acid, according to the method of Example II, thus producing 6α-trifluoromethyl-9α-chloro-prednisone acetate.

EXAMPLE XIX

A solution of 500 mg. of the 21-acetate of 6-monofluoromethyl - 16α - methyl-Δ$^{1,4,6}$-pregnatriene-11β,17α,21-triol-3,20-dione in 20 cc. of methanol was mixed with 2.8 cc. of a 5% solution of potassium hydroxide in water and stirred at 0° C. under an atmosphere of nitrogen for 1 hour; it was then neutralized wth acetic acid and the methanol was distilled under reduced pressure. The residue was triturated with water and the solid was collected, washed with water, dried and recrystallized from ethylacetate-methanol, thus giving approximately 400 mg. of 6-monofluoromethyl - 16α-methyl-Δ$^{1,4,6}$-pregnatriene-11β, 17α,21-triol-3,20-dione.

200 mg. of the above compound was dissolved in 1 cc. of pyridine and 1 cc. of propionic anhydride, the mixture kept at room temperature overnight, poured into ice water, the formed precipitate collected, washed with water, dried and recrystallized from acetone-hexane, thus giving the 21-propionate of 6α-monofluoromethyl-16α-methyl-Δ$^{1,4,6}$-pregnatriene - 11β,17α,21 - triol-3,20-dione.

EXAMPLE XX

A culture of *Streptomyces roseochromogenus* ATCC 3477 was prepared in an inclined agar medium containing 1% of glucose and 1% of yeast extract. 1 cc. of a suspension of this culture was then used to innoculate each one of a series of 250 cc. flasks containing 50 cc. of a sterilized aqueous medium of 2% peptone and 5% corn syrup, the mixtures where then incubated in a shaking machine at 28° C. under aeration for a period of 24–48 hours. There was thus obtained a vegetating growing culture of *Streptomyces roseochromogenus* which was used for the subsequent incubation of the steroid.

10 mg. of 6α-trifluoromethyl-hydrocortisone, obtained as described in Example I, were added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving 6α-trifluoromethyl-16α-hydroxy-hydrocortisone.

A mixture of 2 g. of the above compound, 10 cc. of pyridine and 6 cc. of acetic anhydride was kept at room temperature overnight and then poured into ice water. The precipitate was collected, washed with water, dried and recrystallized from acetone-hexane, thus yielding the 16,21-diacetate of 6α-trifluoromethyl-16α-hydroxy-cortisone.

EXAMPLE XXI

By following the method of the preceding example, 6α-monofluoromethyl-hydrocortisone (cf. Example V) and 6α-difluoromethyl-hydrocortisone (cf. Example IV) were incubated with *Streptomyces roseochromogenus* ATCC 3377 thus giving 6α-monofluoromethyl-16α-hydroxy-hydrocortisone and 6α-difluoromethyl-16α-hydroxy-hydrocortisone. Upon acetylation of the above compounds there were obtained the corresponding 16,21-diacetates.

EXAMPLE XXII

A mixture of 1 g. of 6α-difluoromethyl-16α-hydroxy-hydrocortisone-16,21-diacetate, 50 cc. of t-butanol, 400 mg. of selenium dioxide and 0.3 cc. of pyridine was refluxed for 48 hours under an atmosphere of nitrogen, filtered through Celite, and the filtrate was evaporated to dryness under reduced pressure. The residue was dissolved in acetone, treated with decolorizing charcoal, refluxed for 1 hour, filtered and the acetone was evaporated. The residue was purified by chromatography on neutral alumina and the solid eluates were crystallized from acetone-hexane. There was thus obtained 6α-difluoromethyl-$\Delta^{1,4}$-pregnadiene-11β,16α,17α,21-tetrol-3,20-dione 16,21-acetate.

EXAMPLE XXIII

A mixture of 1 g. of 6α-monofluoromethyl-16α-hydroxy-hydrocortisone 16,21-diacetate, 700 mg. of 2,3-dichloro-5,6-dicyano-1,4-benzoquinone was refluxed for 18 hours. It was then cooled, the 2,3-dichloro-5,6-dicyano-1,4-benzohydroquinone formed during the reaction filtered off and the filtrate evaporated to dryness. The residue was dissolved in acetone and decolorized with 20 g. of alumina. Crystallization from acetone-hexane gave 6α-monofluoromethyl - 16α - hydroxy-prednisolone-16,21-acetate.

500 mg. of the above compound were oxidized with chromium trioxide in acetic acid in accordance with the method of Example II, thus producing 6α-monofluoromethyl-16α-hydroxy-prednisone-16,21-diacetate.

A solution of 250 mg. of the latter compound in 25 cc. of methanol was treated with 125 mg. of potassium hydroxide dissolved in 2 cc. of water and the mixture kept at room temperature for 2 hours, under an atmosphere of nitrogen. It was then neutralized with acetic acid and the solid product collected by filtration. Crystallization from methanol-water gave the free 6α-monofluoromethyl-16α-hydroxy-prednisone.

EXAMPLE XXIV

The preceding example was repeated but using 6α-trifluoromethyl - 16α - hydroxy-hydrocortisone 16,21-diacetate as starting material; there were thus obtained 6α-trifluoromethyl - 16α - hydroxy-prednisolone 16,21-diacetate, 6α-trifluoromethyl-16α-hydroxy-prednisone 16,21-diacetate and 6α-trifluoromethyl-16α-hydroxy-prednisone.

EXAMPLE XXV

A mixture of 1 g. of 6α-trifluoromethyl-16α-hydroxy-prednisolone 16,21-diacetate, 2 g. of chloranil and 20 cc. of n-amyl alcohol was refluxed under an atmosphere of nitrogen for 24 hours. The mixture was cooled, washed with a cold aqueous solution of 10% sodium hydroxide until the washings were colorless, dried over anhydrous sodium sulfate and the n-amyl alcohol was evaporated. Chromatography of the residue on neutral alumina gave the 6–trifluoromethyl-$\Delta^{1,4,6}$-pregnatriene-11β,17α,21-triol-3,20-dione 16,21-diacetate.

By the same method, 6α-monofluoromethyl-16α-hydroxy-prednisone 16,21-diacetate was converted into 6–monofluoromethyl - $\Delta^{1,4,6}$ - pregnatriene-16α,17α,21-triol-3,11,20-trione 16,21-diacetate.

EXAMPLE XXVI

By following the method of Example XX, 6α-monofluoromethyl-9α-fluoro-prednisolone (cf. Example V) and 6α-trifluoromethyl - 9α - fluoro-prednisolone (cf. Example VI) were incubated with *Streptomyces roseochromogenus*, thus producing 6α-monofluoromethyl - 9α - fluoro-16α-hydroxy-prednisolone and 6α-trifluoromethyl-9α-fluoro-16α-hydroxy-prednisolone. Acetylation of the above compounds gave the corresponding 16,21-diacetate.

EXAMPLE XXVII

A mixture of 500 mg. of 6α-monofluoromethyl-16α-hydroxy-prednisolone, obtained after saponification of the 16,21-diacetate according to the method of Example XXIII, 15 cc. of acetone and 0.5 cc. of 70% perchloric acid was kept at room temperature for 1 hour, neutralized with sodium bicarbonate solution and diluted with saturated aqueous sodium chloride solution; the precipitate was collected, washed with a little cold water, dried and recrystallized from acetone-hexane, thus giving the 16,17-acetonide of 6α-monofluoromethyl-$\Delta^{1,4}$-pregnadiene-16α,17α,21-triol-3,20-dione.

The above compound was acetylated in a conventional manner thus giving the 16,17-acetonide of 6α-monofluoromethyl-prednisolone 21-acetate.

In a similar manner, from 6α-difluoromethyl-16α-hydroxy-prednisolone 16,21-diacetate there were obtained successively 6α-difluoromethyl-16α-hydroxy-prednisolone, the 16,17-acetonide of 6α-difluoromethyl-prednisolone and the corresponding 21-acetate.

EXAMPLE XXVIII

By following the method of Example II, 6α-difluoromethyl-hydrocortisone acetate, described in Example IV, was converted into 6α-difluoromethyl - 9α - fluoro-hydrocortisone.

500 mg. of the above compound was incubated with *Streptomyces roseochromogenus* ATCC 3347 essentially following the method of incubation described in Example XX, thus producing 6α-difluoromethyl-9α-fluoro-16α-hydroxy-hydrocortisone.

A solution of 500 mg. of the above compound in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding the 16,17-acetaldehyde-acetal of 6α-difluoromethyl-9α-fluoro-16α-hydroxy-hydrocortisone.

Upon subsequent treatment with acetic anhydride in pyridine solution there was obtained the 16,17-acetaldehyde-acetal of 6α-difluoromethyl - 9α - fluoro-$\Delta^4$-pregnene-11β,16α,17α,21-tetrol-3,20-dione 21-acetate.

In accordance with the method of Example I, the above compound was treated with selenium dioxide in t-butanol solution, thus giving the 16,17-acetaldehyde-acetal of 6α-difluoromethyl-9α-fluoro-prednisolone acetate.

EXAMPLE XXIX

By following the method of Example XXVII, 6α-trifluoromethyl-16α-hydroxy-hydrocortisone obtained as described in Example XX, was converted into 16α,17α-isopropylidenedioxy - 6α - trifluoromethyl - $\Delta^4$ - pregnene-11β,21-diol-3,20-dione.

The above compound was acetylated in a conventional manner, and the resulting 21-acetate was treated with 2,3-dichloro-5,6-dicyano-1,4-benzoquinone, in accordance with the method of Example IV, thus giving 16α,17α-isopropylidenedioxy - 6α - trifluoromethyl - prednisolone acetate.

200 mg. of the latter compound were oxidized with chromium trioxide in acetic acid, according to the procedure of Example II, thus giving 6α-trifluoromethyl-16α,17α-isopropylidenedioxy-prednisone acetate.

EXAMPLE XXX

By treatment with acetone in the presence of perchloric acid, as set forth in Example XXVII, 16α-hydroxy-9α- fluoro - 6α - monofluoromethyl-prednisolone and 16α-hydroxy-9α-fluoro - 6α - trifluoromethyl - prednisolone were converted into the 16α,17α - acetonide of 9α - fluoro-6α-monofluoromethyl-prednisolone and 16α,17α-acetonide of 9α-fluoro - 6α - trifluoromethyl-prednisolone which upon subsequent treatment with acetic anhydride in pyridine solution were transformed into the corresponding acetates.

EXAMPLE XXXI

A mixture of 1 g. of 16α-hydroxy-6α-monofluoromethyl-prednisolone-16,17-acetonide 21-acetate, 2 g. of chloranil, 15 cc. of ethyl acetate and 5 cc. of acetic acid were refluxed under an atmosphere of nitrogen for 96 hours. The mixture was cooled, washed with a cold aqueous solution of 10% sodium hydroxide until the washings were colorless. The organic solution was dried over anhydrous sodium sulfate and the ethyl acetate was evaporated. By chromatography of the residue on neutral alumina, there was obtained the 16α,17α-acetonide of 6-monofluoromethyl - $\Delta^{1,4,6}$ - pregnatriene - 11β,16α,17α,21-tetrol-3,20-dione 21-monoacetate.

In a similar manner, 16α-hydroxy-6α-difluoromethyl-prednisolone-16,17-acetonide 21-acetate and the 16,17-acetaldehyde-acetal of 6α-difluoromethyl-9α-fluoro-16α-hydroxy-hydrocortisone 21-acetate were converted into the corresponding 6-dehydro derivatives, namely the 16,17-acetonide of 6-difluoromethyl - $\Delta^{1,4,6}$ - pregnatriene-11β,16α,17α,21-tetrol-3,20-dione 21-acetate and 16,17-acetaldehyde acetal of 6-difluoromethyl-9α-fluoro-$\Delta^{4,6}$-pregnadiene-11β,16α,17α,21-tetrol-3,20-dione 21 - acetate.

EXAMPLE XXXII

By following the method of Example IV, 500 mg. of 6α-trifluoromethyl-$\Delta^4$-pregnene - 17α,21 - diol-3,20-dione was incubated with a culture of Cunninghamella bainieri ATCC 9244, thus giving 6α-trifluoromethyl-hydrocortisone identical to that obtained in Example I.

We claim:
1. A compound of the following formula:

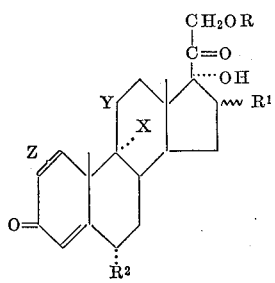

wherein R is selected from the group consisting of hydrogen and a hydrocarbon carboxylic acyl group of less than 12 carbon atoms; $R^1$ is selected from the group consisting of hydrogen, α-methyl, and β-methyl; $R^2$ is selected from the group consisting of trifluoromethyl and difluoromethyl; X is selected from the group consisting of hydrogen, chlorine and fluorine; Y is selected from the group consisting of β-hydroxy and keto; and Z is selected from the group consisting of a double bond between C–1 and C–2 and a saturated linkage between C–1 and C–2.

2. 6α-difluoromethyl-prednisone 21-acetate.
3. 6α-trifluoromethyl-prednisolone 21-acetate.
4. 6α-trifluoromethyl-9α-fluoroprednisolone 21-acetate.
5. 16α - methyl - 6α - difluoromethyl-prednisolone 21-acetate.
6. 16α-methyl-6α-difluoromethyl-9α-fluoroprednisolone 21-acetate.
7. 16β - methyl - 6α - difluoromethyl-prednisolone 21-acetate.
8. 16β-methyl-6α-difluoromethyl-9α-fluoroprednisolone 21-acetate.

9. A compound of the following formula:

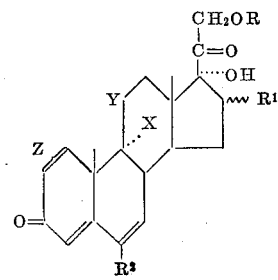

wherein R is selected from the group consisting of hydrogen and a hydrocarbon carboxylic acyl group of less than 12 carbon atoms; $R^1$ is selected from the group consisting of hydrogen, α-methyl, and β-methyl; $R^2$ is selected from the group consisting of trifluoromethyl, difluoromethyl and monofluoromethyl; X is selected from the group consisting of hydrogen, chlorine and fluorine; Y is selected from the group consisting of β-hydroxy and keto; and Z is selected from the group consisting of a double bond between C–1 and C–2 and a saturated linkage between C–1 and C–2.

10. A compound of the following formula:

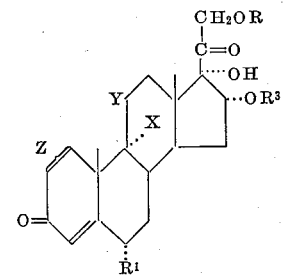

wherein R and $R^3$ are selected from the group consisting of hydrogen and a hydrocarbon carboxylic acyl group of less than 12 carbon atoms; $R^2$ is selected from the group consisting of trifluoromethyl and difluoromethyl; X is selected from the group consisting of hydrogen, chlorine and fluorine, Y is selected from the group consisting of β-hydroxy and keto; and Z is selected from the group consisting of a double bond between C–1 and C–2 and a saturated linkage between C–1 and C–2.

11. 16α-hydroxy-6α-difluoromethyl-prednisolone-16,21-diacetate.
12. 16α-hydroxy-6α-trifluoromethyl - prednisolone 16,21-diacetate.
13. 16α-hydroxy-9α-fluoro-6α-trifluoromethyl - prednisolone 16,21-diacetate.

14. A compound of the following formula:

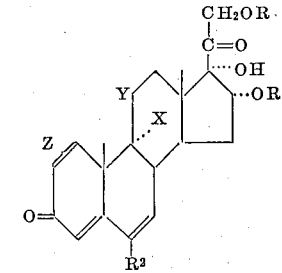

wherein R and $R^3$ are selected from the group consisting of hydrogen and a hydrocarbon carboxylic acyl group of less than 12 carbon atoms; $R^2$ is selected from the group consisting of trifluoromethyl and difluoromethyl; X is selected from the group consisting of hydrogen, chlorine and fluorine; Y is selected from the group consisting of β-hydroxy and keto; and Z is selected from the group consisting of a double bond between C–1 and C–2 and a saturated linkage between C–1 and C–2.

15. A compound of the following formula:

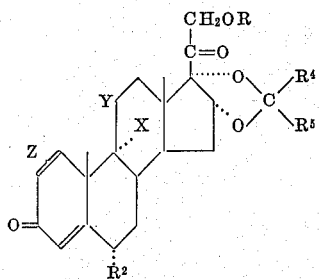

wherein R is selected from the group consisting of hydrogen and a hydrocarbon carboxylic acyl group of less than 12 carbon atoms; $R^2$ is selected from the group consisting of trifluoromethyl and difluoromethyl; $R^4$ and $R^5$ are selected from the group consisting of hydrogen, an alkyl group, an aryl group and an aralkyl group containing from 1 to 8 carbon atoms; X is selected from the group consisting of hydrogen, chlorine and fluorine; Y is selected from the group consisting of β-hydroxy and keto; and Z is selected from the group consisting of a double bond between C–1 and C–2 and a saturated linkage between C–1 and C–2.

16. 16α-hydroxy-9α-fluoro-6α-trifluoromethyl - prednisolone-16α,17α-acetonide 21-acetate.

17. 16α-hydroxy-6α-difluoromethyl - prednisolone 16α,17α-acetonide 21-acetate.

18. 16α-hydroxy-9α-fluoro-6α-difluoromethyl - prednisolone 16α,17α-acetonide 21-acetate.

19. A compound of the following formula:

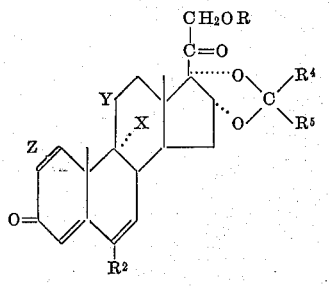

wherein R is selected from the group consisting of hydrogen and a hydrocarbon carboxylic acyl group of less than 12 carbon atoms; $R^2$ is selected from the group consisting of trifluoromethyl and difluoromethyl; $R^4$ and $R^5$ are selected from the group consisting of hydrogen, an alkyl group, an aryl group and an aralkyl group containing from 1 to 8 carbon atoms; X is selected from the group consisting of hydrogen, chlorine and fluorine; Y is selected from the group consisting of β-hydroxy and keto; and Z is selected from the group consisting of a double bond between C–1 and C–2 and a saturated linkage between C–1 and C–2.

20. A compound selected from the group consisting of those having the formula:

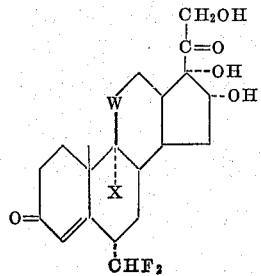

wherein X is selected from the group consisting of hydrogen and fluorine, W is selected from the group consisting of the carbonyl radical and beta-hydroxy-methylene radical; and the 1-dehydro, 6-dehydro and the 1,6-disdehydro derivatives thereof.

21. A compound selected from the group consisting of those having the formula:

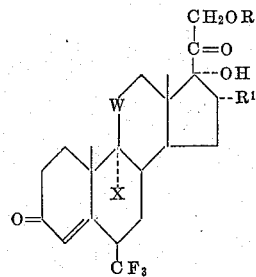

wherein R is selected from the group consisting of hydrogen and lower alkanoyl; $R^1$ is selected from the group consisting of hydrogen, methyl, hydroxy, and lower alkanoyloxy; X is selected from the group consisting of hydrogen, fluorine and chlorine; W is selected from the group consisting of the carbonyl radical and the beta-hydroxymethylene radical; and the 1-dehydro, 6-dehydro, and 1,6-bisdehydro derivatives thereof.

22. A compound selected from the group consisting of those having the formula:

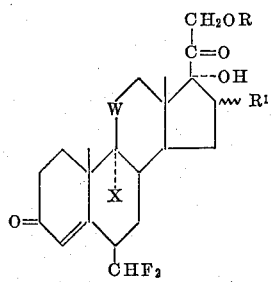

wherein R is selected from the group consisting of hydrogen and a hydrocarbon carboxylic acyl group of less than 12 carbon atoms; $R^1$ is selected from the group consisting of hydrogen and methyl, X is selected from the group consisting of hydrogen and fluorine, and W is selected from the group consisting of the carbonyl radical and the beta-hydroxymethylene radical; and the 1-dehydro, 6-dehydro and 1,6-bisdehydro derivatives thereof.

References Cited by the Examiner

UNITED STATES PATENTS

| | | | |
|---|---|---|---|
| 2,838,499 | 6/1958 | Spero et al. | 260—239.55 |
| 2,838,546 | 6/1958 | Magerlein et al. | 260—397.45 |
| 2,960,436 | 11/1960 | Thoma et al. | 195—51 |
| 2,961,441 | 11/1960 | Bogert et al. | 260—239.55 |
| 2,966,486 | 12/1960 | Smith et al. | 260—239.55 |

LEWIS GOTTS, *Primary Examiner.*

LESLIE H. GASTON, MORRIS LIEBMAN, ELBERT L. ROBERTS, *Examiners.*

R. E. WEXLER, M. L. WILLIAMS,
*Assistant Examiners.*